United States Patent [19]
Brode et al.

[11] 3,708,607
[45] Jan. 2, 1973

[54] PREFABRICATED WALL SYSTEM

[76] Inventors: Eugene G. Brode, 1611 Rio Vista Drive; Jay H. Kleinneiur, 1441 Zangs Boulevard, Apt. 119, both of Dallas, Tex. 75208

[22] Filed: March 18, 1971

[21] Appl. No.: 125,625

[52] U.S. Cl. .......................... 174/48, 52/221, 52/287
[51] Int. Cl. ............................................. H02g 3/04
[58] Field of Search ....174/48, 49; 52/220, 221, 290, 52/211, 212, 287, 367, 372, 729

[56] References Cited

UNITED STATES PATENTS

| | | | |
|---|---|---|---|
| 1,718,253 | 6/1929 | Putnam | 174/49 X |
| 1,750,491 | 3/1930 | Putnam | 52/221 |
| 1,718,252 | 6/1929 | Putnam | 52/220 |
| 1,718,254 | 6/1929 | Putnam | 174/49 X |
| 3,255,563 | 6/1966 | Sauer | 52/221 X |
| 3,377,756 | 4/1968 | Polhamus | 174/48 X |
| 2,913,777 | 11/1959 | Viets | 52/211 X |

FOREIGN PATENTS OR APPLICATIONS 409,340  10/1966  Switzerland ......................... 52/287

*Primary Examiner*—Lewis H. Myers
*Assistant Examiner*—D. A. Tone
*Attorney*—Richards, Harris & Hubbard

[57] ABSTRACT

A prefabricated wall system employing laminar wall panels formed from an expanded high density polystyrene core bonded to two outer skins, the panels being mounted on tracks provided by a longitudinally extending base rail which has hollow electrical ducts therein. Removable cover plates carrying electrical service outlets conceal the base rail ducts, and a hollow trim member is removably secured to a panel to carry wiring vertically from the base rail.

12 Claims, 3 Drawing Figures

INVENTORS:
EUGENE G. BRODE
JAY H. KLEINNEIUR

ATTORNEYS

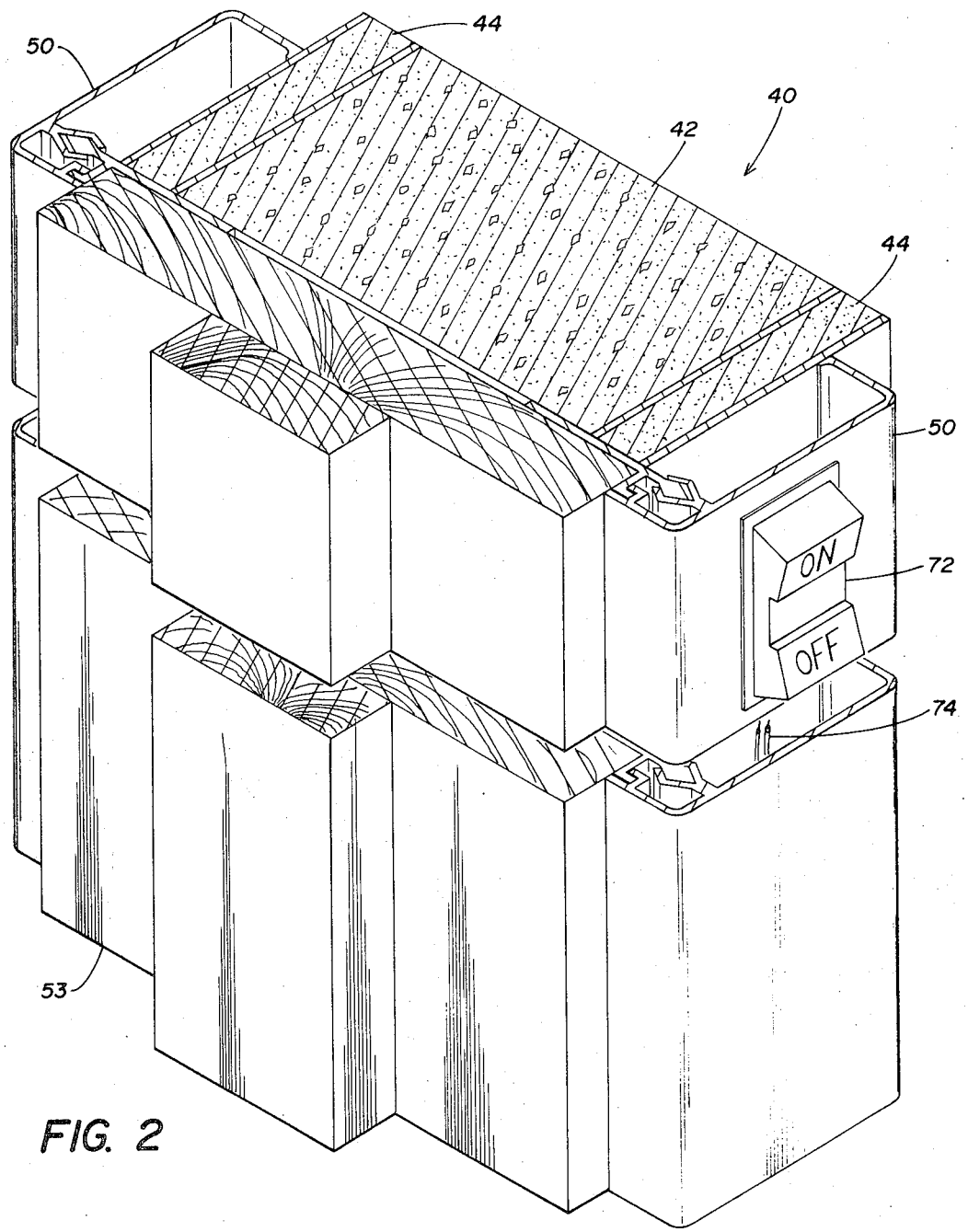
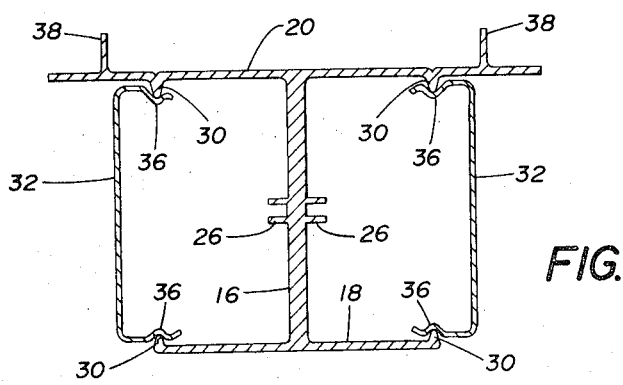

PREFABRICATED WALL SYSTEM

BACKGROUND OF THE INVENTION

The invention relates to prefabricated wall systems, and more specifically, to systems for construction of walls which employ foamed core laminar panels, and which are manufactured for simplified on-site installation with provision for the ready placement of, and modification of, electrical connections therein.

The need for construction materials which are of relatively simple manufacture but which minimize the time and complications involved in on-site construction has long been recognized in the building industry. While it is highly desirable to simplify the nature and extent of the assembly of prefabricated construction materials, it is also often important to have such materials which may readily and flexibly be adapted to a number of possible construction applications.

The wall system provided by the present invention, which has applicability to both interior and exterior wall construction, is of simple design and fabrication, but does have a flexibility to meet various construction objectives, while reducing construction costs.

Specifically, walls constructed in accordance with the present invention may be rapidly installed with provision for the ready installation and modification of electrical, telephone and other types of wiring.

While the invention serves the foregoing purposes, it also provides a constructed wall which is attractive and structurally strong. The prefabricated components of this invention eliminate the necessity of on-site installation of wall framework, exterior and interior wall finishes, electrical and telephone wiring ducts or raceways, insulation, electrical service outlets, and exterior moisture sealing.

The system combines a laminar foam core panel with various extruded members used in the installation thereof such that the panels themselves perform only the basic function of protective enclosure and longitudinal stress relief, while the extruded components of the system form electrical ducts, load distributors and foundation moisture seals, thereby permitting the panel itself to require no operations thereupon in assembly since it comprises simply the interior and exterior finishes and a basic core mass of self-extinguishing expanded polystyrene which is fire resistant, totally inert and resistant to thermal decomposition.

SUMMARY OF THE INVENTION

The prefabricated wall system contemplated by this invention comprises a panel member which may be mounted upon a longitudinally extending base rail having therein a hollow duct for placement of electrical wiring. Removable cover plates carrying desired electrical supply outlets and connections are provided for the base rail, concealing the hollow duct of the base rail and permitting ready installation and modification of wiring. A hollow trim member is adapted to being removably secured to the panel member to provide vertical electrical channels which communicate with the base rail duct.

BRIEF DESCRIPTION OF THE DRAWINGS

FIG. 2 is an isometric fragmented cutaway view of an upper portion of an interior wall at a door jamb; and FIG. 3 is a cross-sectional view of a lower portion of an interior wall constructed in accordance with this invention.

DESCRIPTION OF THE PREFERRED EMBODIMENTS

Figure 1:
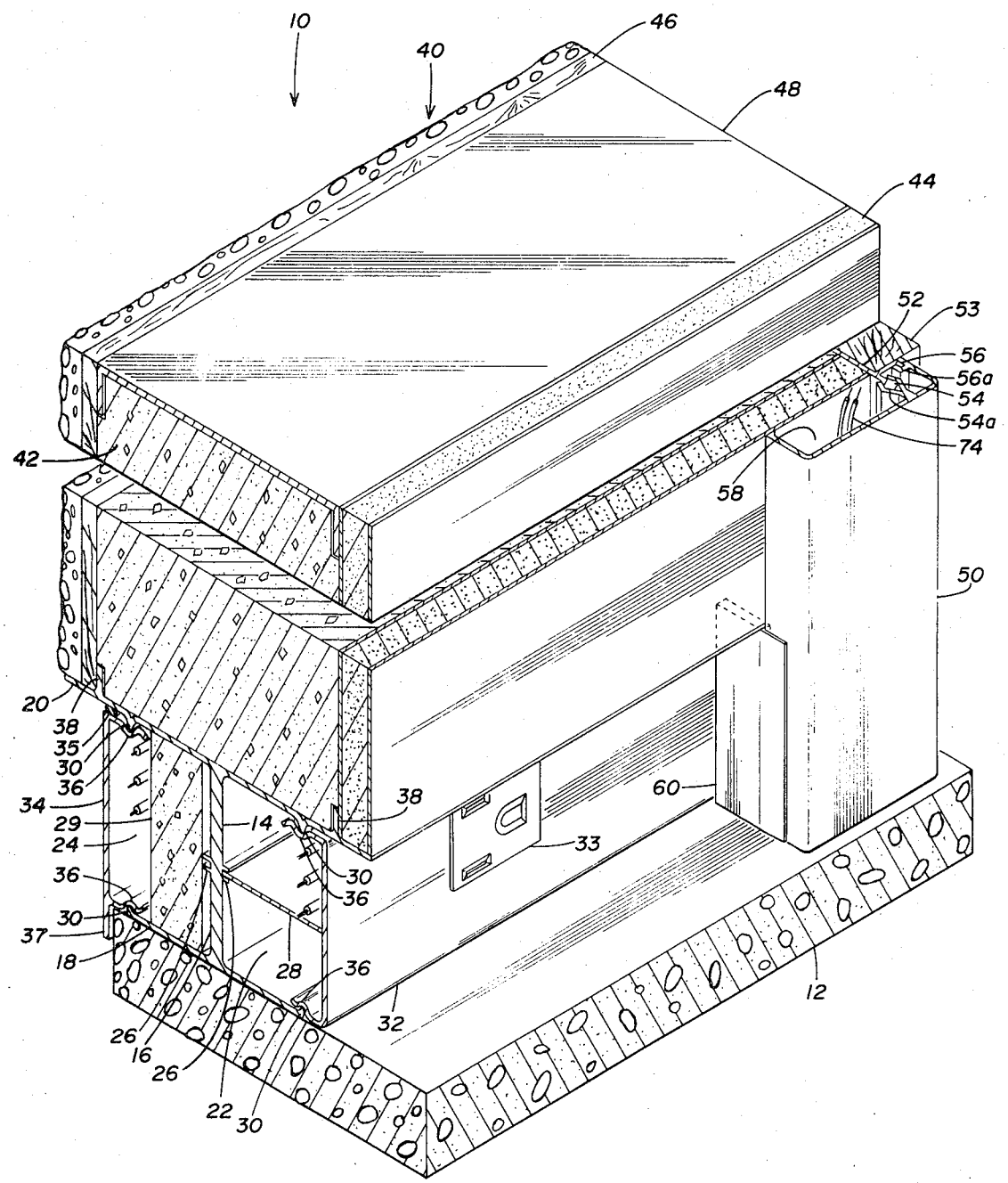
FIG. 1 is a simplified isometric fragmented cutaway view of an exterior wall constructed in accordance with the system of the present invention.

An exterior wall 10 constructed in accordance with this invention is depicted in FIG. 1 with its central portion cutaway. The wall rests on any conventional footing such as a concrete slab 12.

The lower portion of the wall is formed by base rail 14, which is anchored directly on the slab 12. Base rail 14 is in the form of an I-beam, with its web 16 oriented vertically, its lower flange 18 resting directly on the slab 12, and its upper flange 20 supporting the upper portions of the wall.

The base rail 14 may be secured in place on the slab 12 by any conventional means but it is particularly well suited to installation by placing it on a bed of mastic on a slab, and using a "ram set" technique employing a cartridge nail set gun. For installation using this technique, we provided spaced holes (not shown) in the upper flange 20 of the base rail 14, so that such a cartridge gun can be inserted to set the nails.

As can be seen from FIG. 1, the configuration of the base rail 14 defines a pair of longitudinally extending hollow portions or ducts 22 and 24. Pairs of ears 26 are provided on either side of the web 16, so that either of the ducts 22 and 24 may be further divided, as by partition 28. Such further division may be desired to separate different types of wiring, such as high and low voltage carriers. The outer duct 24 may be provided with thermal insulating material 29. Preferably, "knockouts" (not shown) are spaced along web 16 of base rail 14 so that wiring may be crossed over between ducts 22 and 24 at desired locations.

The inward facing surface of each flange of base rail 14 is provided with a detent 30 at its outer end, for cooperation with inner cover plate 32 or outer cover plate 34. Each of the cover plates 32 and 34 have legs 36 which extend from the surface of the cover plate to engage the detents 30 and thus secure the cover plates to the base rail 14. The cover plates 32 and 34 may be readily removed for access to the ducts 22 and 24. Cover plate 32 is provided with electrical outlets 33 and whatever other service connections such as telephone and television antenna, are desired. Preferably, the cover plates also have detents for securing wiring in place. Cover plate 34 has a downwardly extending flange 37 which abuts the side of the slab 12, so that a moisture and termite seal is immediately available. A closed cell compressible filler weather seal 35 is pressed into the space between flange 20 and cover plate 34.

The upper flange 20 of base rail 14 is provided with upstanding mounting tracks 38, which are adapted to receiving the panel member 40 which forms the major portion of wall 10.

The panel member 40 is formed with a self-extinguishing high density expanded polystyrene core 42, which is bonded to outer skins 44 and 46. The outer skins 44 and 46 may be formed from any suitable material, such as plywood, cement asbestos board or gypsum board. Outer skin 46 for the exterior wall shown in FIG. 1 is illustrated with an aggregate finish applied to the basic skin.

The lower edge of panel member 40 is provided with slots in its core 42 to engage the mounting tracks 38 of base rail 14. The upper flange 20 of base rail 14 extends far enough out so that the outer skins 44 and 46 rest directly on the flange 20. This facilitates the finishing operation for the wall since no complicated effort is required to trim up or finish the lower edge of the panel member 40.

The upper edge of panel 40 has slots comparable to those of the lower edge, for engagement with channel member 48. Member 48 serves to distribute vertical loads across the panel and connections made to the wall at the top thereof are made through member 48.

A vertical trim member 50 is affixed to panel member 40 in FIG. 1. The trim member 50 is engaged with a longitudinally extending anchor 52 secured to the edge of a panel member 40 between member 40 and door jamb 53 or other structure adjacent panel member 40. Trim anchor 52 may be affixed to panel member 40 by nailing, gluing or stapling before the jamb 53 is put in position.

The anchor 52 is provided with a diamond shaped detent 54 and a flange 56. The trim member 50 is generally in the shape of an open sided channel, presenting surfaces 54a and 56a to engage the detent 54 and flange 56 of the anchor 52. The legs of the trim member 50 are long enough so that, upon engagement of trim member 50 with the anchor 52, trim member 50 is slightly flexed so that the legs are held in tension against the panel member 40.

The cover plate 32 terminates at a point behind the trim member 50 providing an aperture through which wiring from the duct 22 may be directed into the hollow portion or channel 58 formed by the trim member 50 installed against panel member 40 and jamb 53. Anchor 52 and trim member 50 are members which may be suitably formed by continuous extrusion from a plastic material. If it is desired that the gap between the cover plate 32 and the trim member 50 be covered, an insert 60 may be provided for this purpose, being applied to the trim member 50 at the time of installation.

FIG. 2 illustrates an upper portion of the wall in accordance with the present invention at a door jamb at which a light switch is to be installed several feet above floor level. The door jamb 53 is installed against the end of panel member 40 to form one side of the door frame. The trim member anchor 52 is situated between the door jamb 53 and panel member 40, and is engaged by the trim member 50. A simple toggle switch 72 is mounted in the trim member 50. The wiring 74 for the switch 72 is carried through the channel 58 by the trim member 50 to the electrical raceway provided in the base rail. Thus the trim member provides the trim finish for the door, as well as a light switch and the wiring duct therefor.

Another form of the base rail 14 is illustrated in FIG. 3. In this configuration, the cover plates 32 for the base rail 14 are identical on both sides for use in interior wall construction.

It will be appreciated that the various elements utilized in the foregoing system are of relatively simple, straight-forward manufacture, and may be assembled into a finished wall with a minimum of skilled labor at the construction site. The finished wall panel of standard size may be produced at a factory by the bonding of outer skins to retarded high density foamed polystyrene core. The I-beam which forms the base rail 14, the cover plates 32 and 34, the channel 48, the trim anchor 52 and the trim member 50 may all be formed by continuous extrusion and cut into convenient desired lengths. The cover plates 32 and the trim members 50 may be provided with the electrical outlets and other service connections desired.

The installation of a wall in accordance with this system begins with placement of a base rail 14, which is secured in place along the line of the wall, as by ram setting. In the case of an exterior wall, it may be desirable to provide the other duct 24 with insulating materials. With the base rail in place, the wall panel may be placed in position thereon and attached to adjacent structural members through the top channel 48. Electrical and other service wiring may be installed in the base duct, with the cover plates and trim being installed to provide the desired service connections. Rewiring or wiring modifications may be performed readily.

While specific embodiments of the invention together with modifications thereof have been described in detail and shown in the accompanying drawings, it will be evident that various further modifications are possible in the arrangement and construction of components without departing from the scope of the invention.

What is claimed is:

1. A prefabricated wall system comprising:
   a base rail having a longitudinally extending hollow duct therein;
   a panel member supported by the base rail;
   a removable cover plate on the base rail carrying electrical service outlets and concealing the hollow duct of the base rail; and
   a trim member removably secured to the panel to form a concealed channel communicating at one end thereof with the hollow duct of the base rail to permit passage of wiring between the duct and channel.

2. The system of claim 1 wherein the base rail has two upwardly extending mounting tracks thereon, and the panel member has two slots for mating with the tracks.

3. The system of claim 1 wherein the base rail has substantially an "I" cross-section.

4. The system of claim 3 including a second cover plate for concealing the second hollow portion formed by the "I" cross-section base rail.

5. The system of claim 3, wherein the upper flange of the base rail is at least as wide as the panel member.

6. The system of claim 1 further including a trim anchor adapted to being secured to an edge of the panel member and adapted to engagement with the trim member.

7. A prefabricated wall system comprising:
   a base rail having at least one longitudinally extending hollow duct therein;
   at least one panel member positioned on the base rail;
   at least one cover plate carrying electrical service outlets removably secured to the base rail for concealing the hollow duct, the cover plate having a lip extending downwardly below the base rail; and a trim member removably secured to the panel to form a concealed hollow channel adjacent at one end thereof to the duct in the base rail.

8. A prefabricated wall system comprising:
a base rail having a longitudinally extending hollow duct therein;
a panel member supported by the base rail;
a trim member carrying a light switch and removably secured to the panel to form a concealed channel communicating at one end thereof with the hollow duct of the base rail.

9. An electrical duct-base rail system for a wall employing a finished wall panel to be placed thereon comprising:
an I-beam having its upper flange at least as wide as the panel; and
at least one cover plate removably secured across an open side of the I-beam and having an extended width such that it extends below the I-beam.

10. A prefabricated wall system comprising:
a base rail having an electrical duct therein and having two upstanding mounting tracks;
a laminar panel member mounted on the base rail and having a foamed plastic core between two outer skins, the core being provided with a pair of spaced slots at the lower edge thereof to receive the mounting tracks.

11. The system of claim 16 wherein the base rail is an I-beam having its upper flange at least as wide as the panel and further including a cover plate adaptable to being removably secured across an open side of the I-beam and having an extended width such that when so installed it extends substantially below the I-beam.

12. A prefabricated wall system comprising:
an I-beam base rail having a series of spaced holes in the top flange thereof for receiving a cartridge nail set gun during installation;
a panel member supported by the base rail; and
a removable cover plate on the the base rail carrying electrical service outlets and concealing the duct formed in the I-beam base rail.

* * * * *